Figure 1:
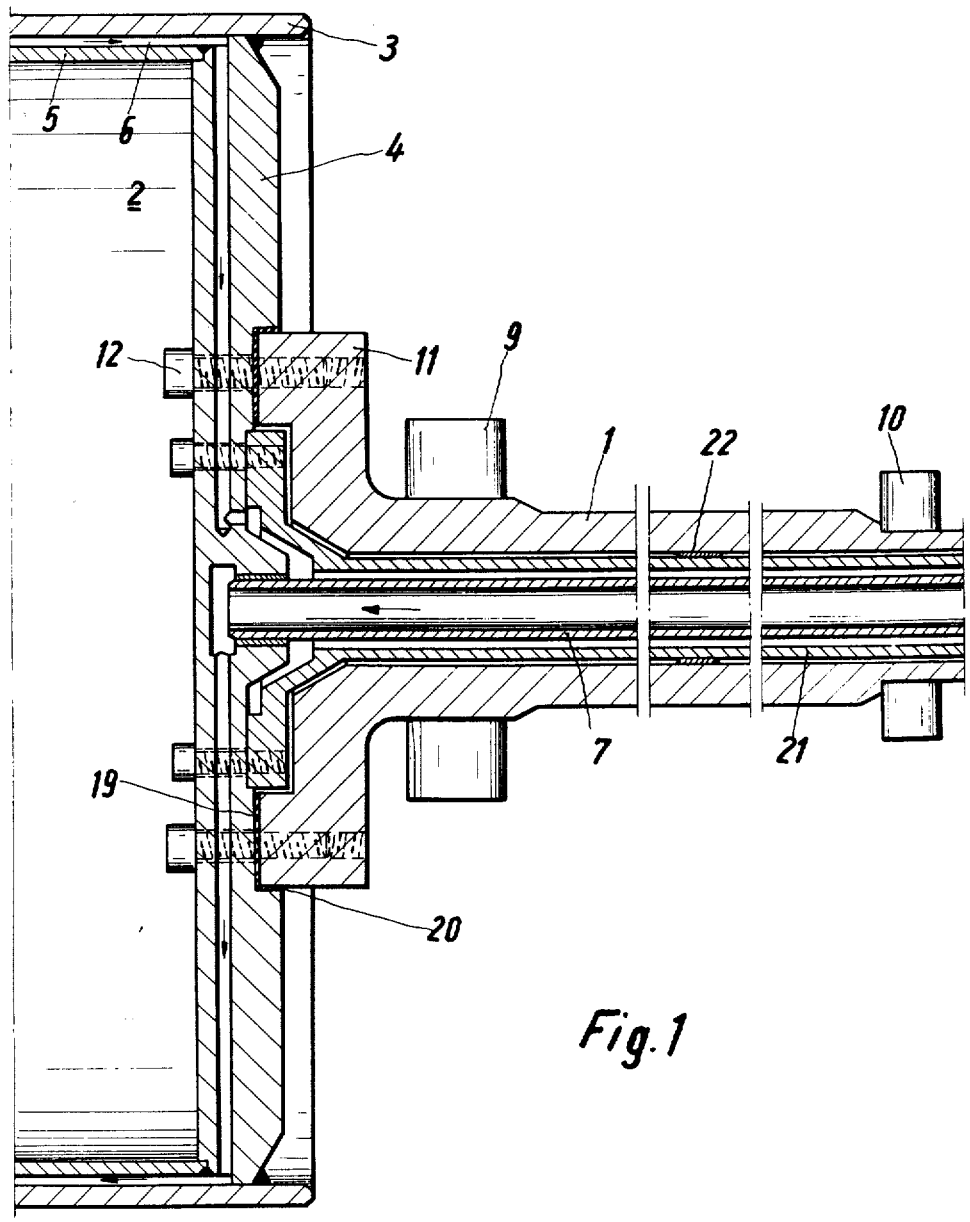

United States Patent [19]

Fleissner

[11] 3,887,250
[45] June 3, 1975

[54] GODET FOR USE IN DRAWING APPARATUS AND DRUM DRYER UNITS

[75] Inventor: Heinz Fleissner, Frankfurt am Main, Germany

[73] Assignee: VEPA AG, Switzerland

[22] Filed: June 21, 1974

[21] Appl. No.: 481,824

Related U.S. Application Data

[60] Division of Ser. No. 221,941, Jan. 31, 1972, Pat. No. 3,831,666, which is a continuation-in-part of Ser. No. 121,890, March 8, 1971, Pat. No. 3,738,423.

[30] Foreign Application Priority Data
Jan. 30, 1971  Germany............................ 2104392

[52] U.S. Cl. .................................. 308/76; 165/89
[51] Int. Cl. ............................................. F16c 37/00
[58] Field of Search ....... 308/76, 78, 106, 107, 108, 308/121, 122, 187, 240; 165/89

[56] References Cited
UNITED STATES PATENTS
2,516,199  7/1950  Fry......................................... 308/76
3,581,812  6/1971  Fleissner et al...................... 165/89

*Primary Examiner*—M. Henson Wood, Jr.
*Assistant Examiner*—Gene A. Church
*Attorney, Agent, or Firm*—Craig & Antonelli

[57] ABSTRACT

A godet for transporting and heating fibers comprises an outer and an inner cylindrical shell which define an annular space therebetween for the flow of a fluid heating medium, an end wall secured to the outer shell, and a bearing shaft attached to the end wall via radial and axial fitting surfaces. A continuous layer of heat-insulating material is provided for the radial and axial fitting surfaces. Also, a godet construction having means to collect and return leakage oil from the outside of a bearing housing to the inside of the housing is disclosed.

6 Claims, 2 Drawing Figures

GODET FOR USE IN DRAWING APPARATUS AND DRUM DRYER UNITS

This is a division of application Ser. No. 221,941 filed Jan. 31, 1972; now Pat. No. 3,831,666, which is a continuation-in-part of pending application Ser. No. 121,890, filed Mar. 8, 1971 now U.S. Pat. No. 3,738,423.

This invention relates to a godet used in drawing apparatus and drum dryers preferably used for yarns, threads, webs and the like made of synthetic fibers and in particular to a godet having a double cylindrical shell defining a free annular space therebetween, guide means for directing the flow of a fluid heating medium required for heating the godget means, means for introducing the heating medium into the free annular space between the two cylindrical shells of the godet, a bearing shaft for the godet attached at the end wall via radial and axial fitting surfaces and supported in a bearing housing associated therewith so that the shaft is rotatable. A godet of this type which has radial and axial fitting surfaces that are partially covered with a heat-insulating material is disclosed in German Patent application P 20 10 693.8 and the above-mentioned U.S. application.

The godet according to the parent application is constructed in such a manner that, when the fluid heating medium is introduced into the double shell of the godet, as little heat as possible is transferred to the bearing shaft. These heat losses from the heating medium cannot be entirely avoided, but are to be kept as low as possible. This is necessary in order to lessen the energy used for heating the godet shell to the required temperature and also for maintaining the bearing shaft at a low temperature to prevent an undesirably high heating of the bearings of the bearing shaft in the bearing housing. Due to the contact points between the godet and the bearing shaft, the shaft is the cause for constant heat losses and constitutes an impediment to heating the godet shell to a maximally high temperature.

In order to solve this problem; namely, to reduce the heat losses due to the use of the bearing shaft to a minimum, it is proposed according to the parent application to provide intermittent metallic contact surfaces on the fitting surfaces between the bearing shaft and the godet shell, and optionally to introduce a heat-insulating material in the interspaces provided between the godet shell and the bearing shaft. In accordance with this invention in order to solve the same problem, the godet has a heat-insulating layer that extends continuously as a ring over the radial fitting surfaces and as a sleeve over the axial fitting surfaces between the bearing shaft and the end wall of the godet.

However, heat losses in the zone of the bearing shaft, through which the heating medium, due to the overhung bearing of the godet, is to be fed and discharged through a centrally disposed pipe arranged in this shaft, can also be prevented in still another manner. It is known, for feeding the heating medium, to dispose a pipe centrally within the bearing shaft at a spacing from the inner wall thereof, to introduce the heating medium through the pipe, and to discharge the heating medium again through the open annular space between the outer wall of the pipe and the inner wall of the bearing shaft. To prevent, in turn, any heat losses, this invention furthermore provides an arrangement such that in the hollow bearing shaft not only pipe, but two pipes are provided, one surrounding the other with a space therebetween. Preferably the external pipe of the two pipes should likewise be spaced from the inner wall of the bearing shaft. Just as before, the heating medium is introduced into the godet through the cross-sectional space of the inner pipe, and again return through the open annular space between the inner wall of the outer pipe and the external wall of the inner pipe, but now a direct contact between the wall touching the heating medium and the bearing shaft is prevented. In this manner, the transfer of heat to the bearing shaft and thus to the bearings of the bearing shaft can be still further reduced.

Furthermore, in the connection between the bearing shaft and the housing, there is always the problem of sealing a shaft or the like, rotating in a housing. The shaft must, in most cases, be lubricated with oil at the bearing point, in such a manner that no leakage oil flows down along the wall of the housing on the outside. This problem occurs, in particular, when the oil, for example, due to the effects of heat, is very thin-bodied, i.e., very fluid, and also when the seal is to serve as a gasket for shafts of large diameters.

This problem is solved by providing a lubricant reflux or backflow bore in the housing wall underneath the shaft or the like and underneath the optionally provided bearing, for example, a lubricated ball bearing. Suitably, the bore is inclined at a certain angle obliquely downwardly from the outside toward the inside, since in this manner the oil can flow back into the interior of the bearing housing solely under the effect of gravity.

It is possible that the oil flows to the outside not only at the lowest point of the bearing. However, the oil must be conducted to the reflux bore, for which purpose all types of guide means are possible. For example, if such a seal is provided at a godet for the drawing of synthetic fibers, the bore is to be provided advantageously at that point where the bearing hub, visible outside of the housing, is surrounded by a wound guard ring. In such a case, the bore then extends transversely through the wound guard ring as well as through the wall of the housing; namely, suitably at the lower apex of the wound guard ring. It is especially advantageous that the leakage oil can be collected in this wound guard ring over the entire circumference thereof, when the inner side of the ring has an annular groove wherein the oil can accumulate and from where the reflux bore extends into the interior of the housing.

Figure 2:
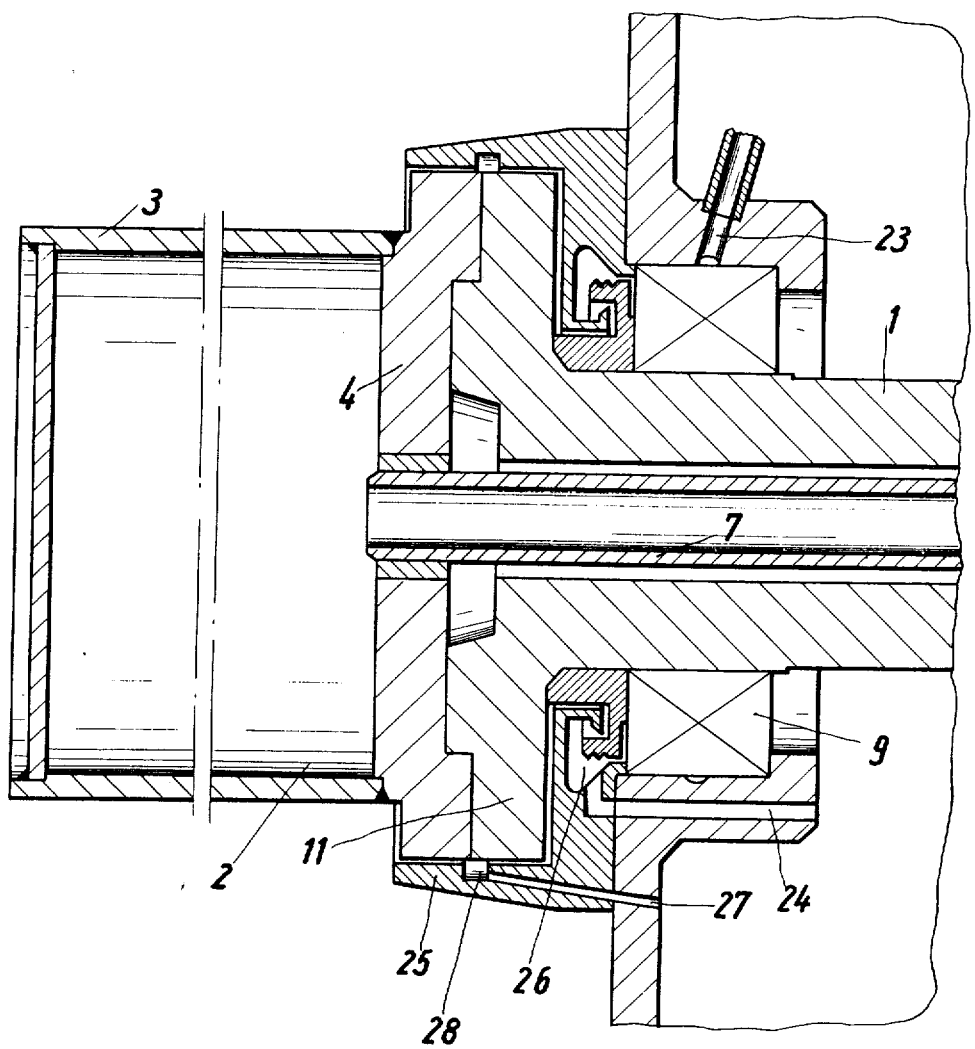

In the drawings, two embodiments of the apparatus of this invention are illustrated, wherein:

FIG. 1 shows a longitudinal section through a godet and the wall of the housing of its associated bearing shaft; and FIG. 2 shows a section similar to that of FIG. 1 through another embodiment of the bearing shaft for the godet.

In FIG. 1, that portion of godet 2 which is connected to a hollow bearing shaft 1 is illustrated. The godet has an outer cylindrical shell or jacket 3 and an end wall 4 attached to the outer shell 3. An inner cylindrical shell or jacket 5 is also attached on the end wall 4 and is spaced a small distance from shell 3. Between the outer and inner shells is an annular space 6, which is subdivided into several chambers. A fluid heating medium, e.g. steam, water, etc. flowing through space 6 is supplied through the central pipe 7 in the hollow bearing shaft 1.

The bearing shaft 1, illustrated with bearings 9 and 10 shrink-fitted thereto, has a mounting flange 11 on the end face which faces the godet 2. This flange is attached to the godet 2 from the end wall 4 of the godet by means of screws 12. In the axial and radial directions, the mounting flange has fitting surfaces which mate with corresponding fitting surfaces provided by end wall 4. The spaces between the fitting surfaces are provided with continuous heat-insulating material 19, 20, by which the metallic contact, disadvantageous for reasons of heat transfer, between the bearing shaft 1 and the end wall 4 of the godet 2 is entirely avoided. It will be appreciated that ring 19 and sleeve 20 may be integral or formed separately.

A heat loss to the bearing can be prevented by a special arrangement provided within the hollow bearing shaft through which the heating medium is fed and discharged. For this purpose, not only one pipe 7 extends through the bearing shaft 1, but instead two pipes 7 and 21, are provided. The external pipe 21 encompasses the internal pipe 7 and is spaced therefrom. Through the thus-created interspace 30, the fluid heating medium is removed, as can be seen from the arrow indicated in the drawing. Suitably, an interspace 31 is also left free between the external pipe 21 and the inner wall surface of the bearing shaft 1, so that here, too, a metallic contact with the bearing shaft 1 is avoided.

The space between the outer wall surface of the external pipe 21 and the inner wall surface of the bearing shaft 1 can be achieved solely by the exact supporting of the pipes 7, 21 at the front and rear ends of the bearing shaft 1. However, it is also possible to provide a ring spacer 22 for this purpose which is also manufactured of a heat-insulating material, e.g. a ceramic.

In FIG. 2, the internal structure of a bearing housing for drawing plant is additionally illustrated.

The bearing shaft 1 in this embodiment is supported in a wall of a bearing housing via a ball bearing 9. This ball bearing is lubricated with oil fed through a bore 23. The oil which penetrates toward the outside through the ball bearing 9, is returned into the interior of the bearing housing through a bore 24 provided below the ball bearing 9 in the wall 4 of the housing. The housing is sealed off toward the outside by a labyrinth seal 26 formed with a wound guard ring 25; this seal essentially prevents the flowing of leakage oil through the gap between the mounting flange 11 and the ring 25. If leakage oil should flow through the seal 26, after all, it will collect in the annular groove 28 on the inside of the wound guard ring 25 and will flow back into the housing from the groove through a lubricant reflux bore 27. The bore 27 extends from the outside obliquely in the downward direction into the bearing housing. This bore ensures with certainty that each drop of leakage oil is returned into the bearing housing.

It will be understood that the details of the internal construction of the fiber handling portion of the godet shown in FIG. 2 are the same as shown in FIG. 1 and that these details have been omitted for the sake of simplicity. Thus the fluid heating medium is returned from shell 3 via an annular space to the space surrounding the pipe 7.

While the novel embodiments of the invention have been described, it will be understood that various omissions, modifications and changes in these embodiments may be made by one skilled in the art without departing from the spirit and scope of the invention.

What I claim is:

1. A godet comprising a cylindrical shell for transporting fiber, a rotatable bearing shaft secured to an end wall of said cylindrical shell, a lubricated bearing for allowing rotation of said shaft, a lubricant seal for the shaft, said shaft being disposed in a bearing housing and extending toward the outside of the housing through a wall of the housing, said godet being characterized in that underneath the shaft and underneath the lubricated bearing, a lubricant return means is provided in the housing wall for directing leaking lubricant back into said housing.

2. The godet of claim 1 wherein the lubricant return means includes a lubricant bore that is obliquely inclined at an angle in the downward direction from the outside toward the inside of said housing.

3. The godet of claim 2 wherein means are provided for collecting the leaking lubricant flowing from the bearing seal toward the outside and conducting the leaking lubricant to the inlet port of the bore.

4. The godet of claim 3 wherein said seal includes a wound guard ring disposed externally of the housing, and the lubricant bore extends transversely through the wound guard ring.

5. The godet of claim 4 wherein the lubricant bore is provided at the lower apex of the wound guard ring.

6. The godet of claim 5 wherein an annular groove is provided on the inside of the wound guard ring, from which groove the lubricant bore extends through the wall of the housing.

* * * * *